US008850299B2

(12) United States Patent
Chabanne et al.

(10) Patent No.: US 8,850,299 B2
(45) Date of Patent: Sep. 30, 2014

(54) PROCESSING OF BIOMETRIC DATA BY TRANSFORMATION

(75) Inventors: Hervé Chabanne, Le Ponant de Paris (FR); Julien Bringer, Le Ponant de Paris (FR)

(73) Assignee: Morpho, Paris (FR)

( * ) Notice: Subject to any disclaimer, the term of this patent is extended or adjusted under 35 U.S.C. 154(b) by 447 days.

(21) Appl. No.: 12/637,192

(22) Filed: Dec. 14, 2009

(65) Prior Publication Data

US 2010/0162072 A1 Jun. 24, 2010

Related U.S. Application Data

(63) Continuation of application No. PCT/FR2008/051044, filed on Jun. 12, 2008.

(51) Int. Cl.
*H03M 13/00* (2006.01)
*G07C 9/00* (2006.01)
*H04L 9/32* (2006.01)

(52) U.S. Cl.
CPC .......... *G07C 9/00158* (2013.01); *H04L 9/3236* (2013.01); *H04L 2209/34* (2013.01); *H04L 9/3231* (2013.01)
USPC ............................. 714/799; 714/800; 713/186

(58) Field of Classification Search
None
See application file for complete search history.

(56) References Cited

U.S. PATENT DOCUMENTS

| 6,038,315 | A | 3/2000 | Strait et al. |
| 6,836,554 | B1 | 12/2004 | Bolle et al. |
| 2007/0183632 | A1* | 8/2007 | Bringer et al. ................ 382/115 |
| 2010/0014655 | A1* | 1/2010 | Chmora et al. ................. 380/28 |
| 2010/0077278 | A1* | 3/2010 | Wang et al. .................... 714/752 |

FOREIGN PATENT DOCUMENTS

| EP | 1274040 A1 | 1/2003 |
| FR | 2871910 A | 12/2005 |
| WO | WO 2007/029529 A1 | 3/2007 |

OTHER PUBLICATIONS

Zheng et al., "Cryptographic Key Generation from Biometric Data Using Lattice Mapping", Aug. 20-24, 2006, 18th International Conference on Pattern Recognition, IEEE, pp. 513-516.*
Juels et al., "A Fuzzy Commitment Scheme", 1999, ACM, pp. 28-36.*
Sutcu et al., "Feature Transformation of Biometric Templates for Secure Biometric Systems based on Error Correcting Codes", 2008, IEEE.*
International Search Report for related International Application No. PCT/FR2008/051044 Report Dated Feb. 2, 2009.

(Continued)

*Primary Examiner* — Michael Maskulinski
(74) *Attorney, Agent, or Firm* — Miller, Matthias & Hull LLP

(57) ABSTRACT

Biometric data relating to a biological part are processed by obtaining, on the one hand, a first set of transformed biometric data (f(B1)) by applying at least one irreversible transformation to a first set of biometric data (B1), and, on the other hand, a second set of transformed biometric data (f(B2)) by applying said transformation to a second set of biometric data (B2). Thereafter, a decision is made as to whether the second biometric data set corresponds to the first biometric data set on the basis of a comparison between the first transformed biometric data set and the second transformed biometric data set, said comparison being performed at the bit level of a digital representation of said first and second transformed biometric data sets as a function of an error corrector code word.

14 Claims, 2 Drawing Sheets

(56) References Cited

OTHER PUBLICATIONS

Beier, Thaddeus et al., "Feature-Based Image Metamorphosis", SIGGRAPH 1992: Proceedings of the 19$^{th}$ annual conference on Computer graphics and interactive techniques.

Ang, Russell et al., "Cancelable Key-Based Fingerprint Templates", 2005, pp. 242-252, Spring-Verlag Berlin Heidelberg 2005.

Juels, Ari et al., "A Fuzzy Commitment Scheme", 1999, pp. 28-36.

* cited by examiner

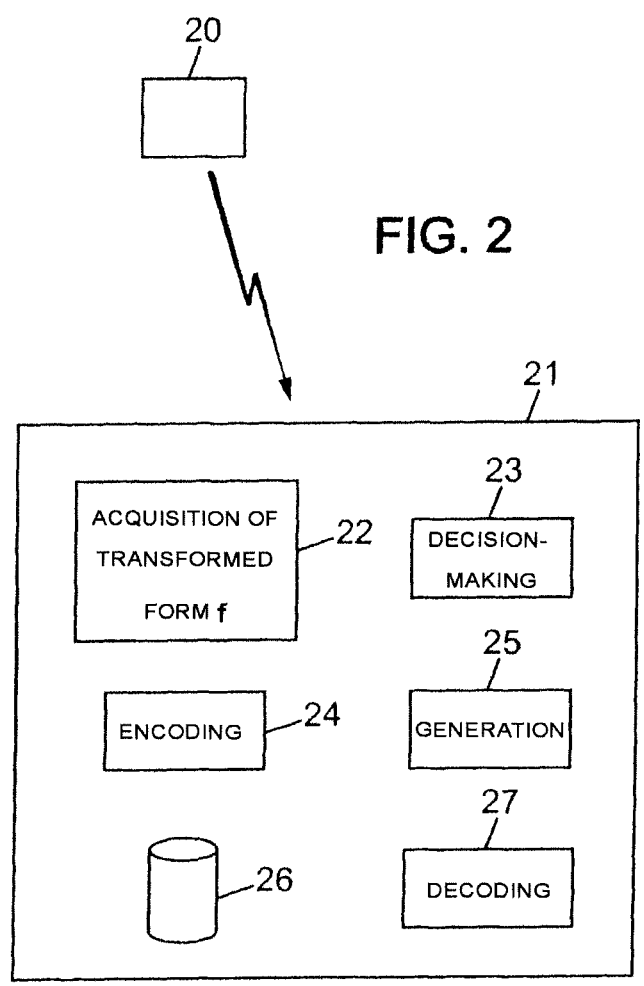

PROCESSING OF BIOMETRIC DATA BY TRANSFORMATION

PROCESSING OF BIOMETRIC DATA BY TRANSFORMATION CROSS-REFERENCE TO RELATED APPLICATIONS

This application is a U.S. national stage filing of International Patent Application No. PCT/FR2008/051044 filed on Jun. 12, 2007, which claims priority under the Paris Convention to the French Patent Application No. 07 04170 filed on Jun. 12, 2007.

FIELD OF THE DISCLOSURE

The present invention relates to the processing of biometric data, and, to be more specific, to the recognition of biometric data on the basis of a comparison of transformed biometric data.

BACKGROUND OF THE DISCLOSURE

Some access control systems are based on an analysis of a person's biometric features in order to determine for example whether said person is authorized for access to a protected location. Said analysis of biometric features is also used in some authentication or identification systems that set out to authenticate or identify a person. This analysis is based conventionally on a comparison of biometric data collected about a person under inspection with data stored in a database.

So, for example, where access control systems are involved, biometric data on people for whom access is authorized are stored in a database. At the end of a stage of comparing data collected about a person under inspection with stored data, the system is able to determine whether said person is among those for whom access is authorized.

Biometric data is very substantially confidential in nature. Consequently, care needs to be taken to ensure said confidentiality is protected during the manipulation thereof, particularly in the interests of protecting privacy.

To this end, in the document U.S. Pat. No. 6,836,554, it is held that such biometric data are transformed by applying an irreversible transformation function thereto. Under these conditions, it is then possible for said biometric data to be manipulated in a transformed form which does not allow the original biometric data to be retrieved. Indeed, the stage that comprises comparing stored biometric data and biometric data relating to a person under inspection is then carried out on the basis of biometric data so transformed.

By proceeding in this way, even if an ill-intentioned third party intercepts said transformed biometric data, he is not able to infer the corresponding original biometric data therefrom since the transformation function which has been used is not reversible.

In this context, the greater the deformation of said biometric data caused by applying said transformation function f the higher the level of protection afforded to the confidentiality of said biometric data.

However, it should be noted that the transformed biometric data is compared in this context over the entire spatial representation of said biometric data. Consequently, such a comparison may yield spurious results where the spatial deformations caused by applying the transformation function f are too substantial. Indeed, in the case for example of biometric data relating to a face, the algorithms aimed at determining whether two deformed face images correspond to the same face may indicate that two different faces are involved, simply because said two face images have sustained deformations that are too substantial for said comparison algorithms.

In fact, in this type of biometric system, this comparison stage is an essential stage on which the reliability of a biometric system depends.

The present invention sets out to improve the situation.

SUMMARY OF THE DISCLOSURE

A first aspect of the present invention proposes a method of processing biometric data relating to a biological part, said method including the following stages:

/a/ obtaining a first set of transformed biometric data by applying at least one irreversible transformation f to a first set of biometric data;

/b/ obtaining a second set of transformed biometric data by applying said transformation to a second set of biometric data;

/c/ deciding whether the second biometric data set corresponds to the first biometric data set on the basis of a comparison between the first transformed biometric data set and the second transformed biometric data set;

wherein said comparison is performed on the basis of a digital representation of said first and second transformed biometric data sets as a function of an error-correcting code word.

By means of these arrangements, it is possible to manipulate biometric data that has sustained substantial deformation, while implementing a comparison stage that yields dependable results. A high level of protection of the confidentiality of the manipulated biometric data can thus be obtained while providing a very reliable biometric data recognition system. Indeed, on the one hand, the manipulated biometric data are transformed irreversibly, and, on the other hand, they are manipulated in order to be compared at the bit level in their digital representation, which means that dependable comparison results can be obtained.

Moreover, it may also be noted that by proceeding in this way, the greater the transformation f applied to the biometric data under consideration the better the results of said comparison stage may be, contrary to the teaching provided in the document U.S. Pat. No. 6,836,554. Indeed, according to this latter document, the comparison between two images in relation to biometric data is performed overall in space according to spatial representations of the biometric data to be compared. Because of this, said comparison is not able to provide a dependable result in the event of a substantial deformation. But, from another point of view, it should be noted that the more substantial the deformations the higher the level of data confidentiality. Consequently, in the context of the teaching in the document U.S. Pat. No. 6,836,554, the level of confidentiality that may be expected is limited.

In one embodiment of the present invention, the transformed biometric data are compared at the bit level in a digital representation of the biometric data, and substantial data deformation is therefore tolerated. Moreover, not only does said comparison yield dependable results even in the event of large-scale deformations but the more substantial the deformations the more dependable the comparison becomes.

By means of these features, it is possible to obtain a level of confidentiality of the biometric data that is much higher than in the prior art, while also getting consistently good results at the comparison stage.

The transformation may be revocable, in other words where biometric data confidentiality is compromised, another transformation can be generated different from that previously used in order to transform the biometric data, and said other transformation can be applied to the biometric data under consideration during this processing operation in order to obtain anew a high level of protection of the confidentiality of the manipulated biometric data.

The first biometric data set may to advantage be captured during an enrolment phase, conventionally implemented in biometric systems. Said first biometric data set is then transformed by applying at least one irreversible transformation. The biometric data may be stored in the database in their transformed form to protect their confidentiality.

In one embodiment of the present invention, the first transformed biometric data set is obtained in an encoded form by applying an "exclusive OR" operation between the first transformed biometric data set and the error-correcting code word and, at the stage /c/ the following stages are performed:

/1/ applying an "exclusive OR" operation between the second transformed biometric data set and the first transformed biometric data set in an encoded form; and /2/ deciding that the second biometric data set corresponds to the first biometric data set if the result obtained at the end of stage /1/ is equal to the result of the "exclusive OR" operation applied between the error-correcting code word and an error when a decoding algorithm associated with said error-correcting code word is adapted to determine said error.

Thus, when a decoding algorithm associated with the error code word is able to determine the error, it is inferred therefrom that the transformed biometric data of the first and second sets correspond. To this end, it may be decided that the second biometric data set corresponds to the first biometric data set when the error has a weight below the correction capacity of the error-correcting code word.

The error-correcting code word may be stored in a database in a hashed form obtained by applying a hash function to said error-correcting code word.

After implementing a decoding algorithm associated with the error code word, the error may be determined. It is then possible to remove the error so determined and to verify the error-correcting code word in a hashed form.

Prior to stage /a/, an enrolment phase may be provided during which, the first biometric data set is captured, AND the error correcting code word is randomly generated.

The first transformed biometric data set may thus be stored in a database in an encoded form obtained by applying an "exclusive OR" operation between the first transformed biometric data set and the error-correcting code word.

In the context of the present invention, the terms "irreversible transformation" should be taken in their most general sense, in other words, starting from the transformed biometric data obtained by applying said transformation, it is not possible to retrieve the original biometric data.

The transformation may thus be held to be irreversible because it intrinsically presents characteristics of irreversibility, or again, quite simply because it is kept secret.

The first and second biometric data sets may correspond to biometric data collected in respect of the biological part.

Said first and second biometric data sets may also correspond to biometric data extracted from biometric data collected in respect of the biological part.

Said first and second biometric data sets may also correspond to biometric data extracted from transformed biometric data obtained by applying another irreversible transformation to biometric data collected in respect of the biological part.

A second aspect of the present invention proposes a biometric data processing device adapted to implement a method of processing biometric data according to the first aspect of the present invention.

A third aspect of the present invention proposes a biometric data processing system including a biometric data processing device according to the second aspect of the present invention and at least one biometric sensor adapted to provide said biometric data processing device with a biometric data set.

Other aspects, purposes and advantages of the invention will become clearer from reading the description of one of the embodiments thereof.

BRIEF DESCRIPTION OF THE DRAWINGS

The invention will also be better understood with the help of the drawings, wherein:

FIG. 2 shows a biometric data processing system in accordance with one embodiment of the present invention.

DETAILED DESCRIPTION OF THE DISCLOSURE

Figure 1:
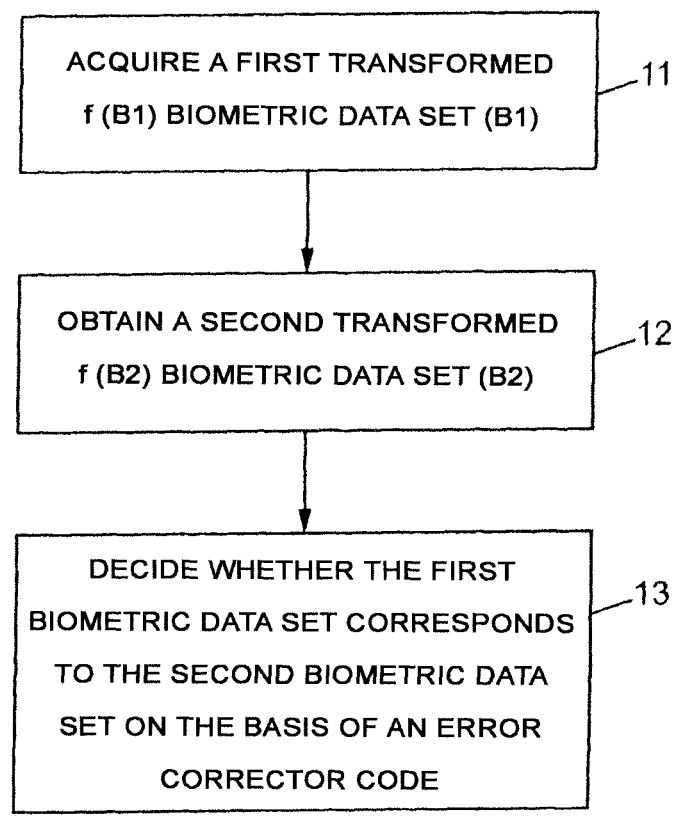
FIG. 1 shows the main stages implemented in accordance with one embodiment of the present invention.

FIG. 1 shows the main stages in one embodiment of the present invention.

Reference biometric data are stored, for example, in a database in order to be used as a reference at the comparison stage and to decide whether or not the biometric data under inspection correspond to said reference biometric data.

To increase the level of protection of the confidentiality of the biometric data, provision is made for said reference biometric data to be stored in a transformed form which does not allow the original reference biometric data to be retrieved. Biometric data relating to a one biological part of a person can be thus collected as a first reference biometric data set. Next, a non-reversible transformation function f is then applied to said first reference biometric data set in order to obtain a first transformed biometric data set which is stored in a database accessible to a decision-making unit responsible for deciding whether collected biometric data correspond to the reference biometric data.

Provision is thus made in this case for the reference biometric data to be manipulated in a transformed form.

At a stage 11, the first transformed biometric data set is acquired, for example via access to a database.

At a stage 12, a second transformed biometric data set is obtained. To this end, provision may be made to collect a second biometric data set, and then to apply thereto a transformation f in order to obtain said second transformed biometric data set.

In one embodiment of then present invention, the stage of capturing the reference biometric data may include an extraction of more specific biometric data from the collected biometric data. Thus, for example, when the biometric data under consideration correspond to fingerprints, provision may be made to extract data in relation to the minutiae thereof.

When said capture stage includes such extraction, provision may be made to apply the transformation either before said extraction, in other words to the collected biometric data, or after extraction, in other words in the case of fingerprints for example, to the data relating to the minutiae, or again both before the extraction stage and after the extraction stage. In the latter case, it should be noted that data confidentiality protection is increased.

It should be noted that, in the context of the present invention, the term "transformation" denotes a non-reversible function that can be used to transform biometric data.

The transformation may in particular correspond to a spatial deformation applied in a reference system of the biometric image received. Known image deformation techniques, or morphing techniques, may be used. Said transformation may be geometric or spatial. Such transformations are described in the Thaddeus Beier and Shawn Neely document, Feature-based image metamorphosis, SIGGRAPH '92: Proceedings of the 19$^{th}$ annual conference on Computer graphics and interactive techniques.

Transformations f can be used which are based on a transformation of coordinates, like the ones described in the document U.S. Pat. No. 6,836,554. Thus, for example, said transformation f may correspond to cutting an image in two dimensions relating to the biometric data into a plurality of parts, and then spatially deforming the plurality of parts in each image part. Provision may be made in this case for more substantial transformations to be applied to the biometric data.

Provision may also be made to use a transformation based on an axial symmetry, as is described in the Russell Ang and Reihaneh Safavi-Naini and Luke McAven document, Cancelable Key-Based Fingerprint Templates. ACISP 2005.

The biometric data under consideration, in other words that of the first and second data sets, can also be deformed by applying a transformation in a digital representation of the biometric data, such as for example by applying a polynomial transformation.

Then, at a stage 13, the first and second biometric data sets are compared so as to determine whether they correspond to the same original biometric data. To advantage, provision is made in this case to perform said comparison at the bit level of the biometric data under consideration, on the basis of an error-correcting code word.

The document "A Fuzzy Commitment Scheme" by Juels and Wattenberg, 1999, proposes a comparison of this type in the form of a conventional decoding problem with the use of an error-correcting code word.

In this case, in one embodiment, provision is made to apply an error-correcting code word in the context of the first and second transformed biometric data sets.

Thus, to implement the biometric data comparison stage, an "exclusive OR" operation is performed between the first transformed biometric data set f(B1) and an error-correcting code word c. Transformed and encoded biometric data δ are then obtained in accordance with the following equation:

$$\delta = f(B1) \oplus c$$

Then, to compare the collected biometric data B2 with the reference biometric data B1, a determination is made as to whether the following operation is verified:

$$\delta \oplus f(B2) = c \oplus e$$

wherein f(B2) corresponds to the second transformed biometric data set and e is an error which may be determined by a decoding algorithm associated with said error-correcting code word.

In the event of said equation being verified, it is then inferred thereby that the first set of stored biometric data B1 and the second set of collected biometric data B2 match.

By proceeding in this way, whereas poor results would be obtained from a conventionally performed comparison between transformed biometric data sets, in this case, good results are able to be obtained even for images that are relatively highly deconstructed.

One embodiment of the present invention can be applied to advantage to any type of biometric data relating to a biological part such as, for example, fingerprints, the iris or again the face.

It should here be noted that the results obtained by applying an embodiment of the present invention in the context of fingerprints offer a high level of reliability, contrary to those obtained by applying a conventional comparison stage, or again by applying a matching algorithm, to biometric data relating to fingerprints as is described in the document U.S. Pat. No. 6,836,554. Indeed, comparison algorithms are conventionally based on a structure related to the biological part concerned and, when said structure is able to be lost even during a slight transformation, as is the case with a fingerprint, the results obtained may rapidly become spurious.

On the other hand, the protection in respect of the original biometric data is increased since the securities guaranteed by transformation and storage in an encoded form add up.

The first reference biometric data set can be obtained during an enrolment phase of the biometric data processing method under consideration.

In one embodiment of the present invention, the error-correcting code word may be randomly generated during said enrolment phase. It is then possible under these conditions to store the first transformed biometric data set in an encoded form with the error-correcting code word, by applying an "exclusive OR" operation between said first biometric data set and the error-correcting code word. The first transformed and encoded biometric data set is therefore acquired directly in this case to perform the comparison stage.

FIG. 2 shows a biometric data processing system that includes a biometric data processing device 21 and a plurality of biometric sensors 20 adapted to provide said device 21 with a second biometric data set B2.

Said processing device 21 including an acquisition unit 22 adapted to obtain a first transformed biometric data set f(B1) by applying at least one irreversible transformation f to a first biometric data set B1 and a second transformed biometric data set f(B2) by applying the transformation to a second biometric data set B2.

Said acquisition unit 22 is thus adapted to apply an irreversible transformation f to biometric data in accordance with one embodiment of the present invention.

The processing device 21 further includes a decision-making unit 23 adapted to decide that the second biometric data set corresponds to the first biometric data set on the basis of a comparison between the first transformed biometric data set and the second transformed biometric data set. Said decision-making unit includes means adapted to perform the comparison at the bit level of a digital representation of said first and second transformed biometric data sets as a function of an error-correcting code word in accordance with one embodiment of the present invention.

Said processing device further includes a decoder 27 which can be used to implement a decoding algorithm which is associated with the error code word. As a consequence, the corresponding error can be determined. On the basis of this information, the decision-making unit is thus able to make a decision.

Said biometric data processing device may further include an encoding unit 24 adapted to provide the first transformed biometric data set in an encoded form by applying an "exclusive OR" operation between the first transformed biometric data set and the error-correcting code word. In this case, the decision-making unit is adapted to:

apply an "exclusive OR" operation between the second transformed biometric data set and the first transformed biometric data set in an encoded form; and decide that the second biometric data set corresponds to the first reference biometric data set if the result obtained at the end of stage /1/ is equal to the result of the "exclusive OR" operation applied between the error-correcting code word and an error when a decoding algorithm associated with said error-correcting code word is adapted to determine said error.

Said biometric data processing device may also include a database 26 in which is stored the first transformed biometric data set in an encoded form obtained by applying an "exclusive OR" operation between the first transformed biometric data set and the error-correcting code word.

Said database 26 may also store the error-correcting code word in a hashed form obtained by applying a hash function to said error-correcting code word.

Moreover, said processing device 21 may include a unit 25 for random error-correcting code word generation.

The invention claimed is:

1. A method of processing biometric data relating to a biological part, said method including the following stages:
   /a/ obtaining a first set of transformed biometric data by applying at least one transformation intrinsically presenting characteristics of irreversibility to a first set of biometric data;
   /b/ obtaining a second set of transformed biometric data by applying said transformation to a second set of biometric data;
   /c/ deciding whether the second biometric data set corresponds to the first biometric data set on the basis of a comparison between the first transformed biometric data set and the second transformed biometric data set;
   wherein said comparison is performed on the basis of a digital representation of said first and second transformed biometric data sets as a function of an error-correcting code word, wherein the transformation is irreversible because it is secret.

2. The biometric data processing method as claimed in claim 1, wherein the first transformed biometric data set in an encoded form is obtained by applying an "exclusive OR" operation between the first transformed biometric data set and the error-correcting code word; and
wherein the stage /c/ includes the following stages:
   /1/ applying an "exclusive OR" operation between the second transformed biometric data set and the first transformed biometric data set in an encoded form; and
   /2/ deciding that the second biometric data set corresponds to the first biometric data set if the result obtained at the end of stage /1/ is equal to the result of the "exclusive OR" operation applied between the error-correcting code word and an error when a decoding algorithm associated with said error-correcting code word is adapted to determine said error.

3. The biometric processing method as claimed in claim 1, wherein the first transformed biometric data set is stored in a database in an encoded form obtained by applying an "exclusive OR" operation between the first transformed biometric data set and the error-correcting code word.

4. The biometric data processing method as claimed in claim 3, wherein the error-correcting code word is stored in a database in a hashed form obtained by applying a hash function to said error-correcting code word.

5. The biometric data processing method as claimed in claim 1, comprising, prior to stage /a/, an enrollment phase, said enrollment phase comprising: capturing the first biometric data set, and, randomly generating the error-correcting code word.

6. The biometric data processing method as claimed claim 1, wherein the first and second biometric data sets correspond to biometric data collected from the biological part.

7. The biometric data processing method as claimed in claim 1, wherein the first and second biometric data sets correspond to biometric data extracted from biometric data collected from the biological part.

8. The biometric data method as claimed in claim 1, wherein the first and second biometric data sets correspond to biometric data extracted from transformed biometric data obtained by applying another transformation intrinsically presenting characteristics of irreversibility to biometric data collected from the biological part.

9. A device for the processing of biometric data relating to a biological part, said device including:
   an obtaining unit adapted to obtain a first transformed biometric data set by applying at least one transformation intrinsically presenting characteristics of irreversibility to a first biometric data set and a second transformed biometric data set by applying said transformation to a second biometric data set;
   a decision-making unit adapted to decide whether the second biometric data set corresponds to the first biometric data set on the basis of a comparison between the first transformed biometric data set and the second transformed biometric data set;
said decision-making unit including means adapted to perform said comparison at the bit level of a digital representation of said first and second transformed biometric data sets as a function of an error-correcting code word, wherein the transformation is irreversible because it is secret.

10. The biometric data processing device as claimed in claim 9, further including an encoding unit adapted to provide the first transformed biometric data set in an encoded form by applying an "exclusive OR" operation between the first transformed biometric data set and the error-correcting code word; and wherein the decision-making unit is adapted to:
   apply an "exclusive OR" operation between the second transformed biometric data set and the first transformed biometric data set in an encoded form; and
   decide that the second biometric data set corresponds to the first reference biometric data set if the result obtained at the end of stage /1/ is equal to the result of the "exclusive OR" operation applied between the error-correcting code word and an error when a decoding algorithm associated with said error-correcting code word is adapted to determine said error.

11. The biometric data processing device as claimed in claim 9, further including a database wherein is stored the first transformed biometric data set in an encoded form obtained by applying an "exclusive OR" operation between the first transformed biometric data set and the error-correcting code word.

12. The biometric processing device as claimed in claim 11, wherein the database stores the error-correcting code word in a hashed form obtained by applying a hash function to said error-correcting code word.

13. The biometric data processing device as claimed in claim 9, further including a unit for random error-correcting code word generation.

14. The biometric data processing system including a biometric data processing device as claimed in claim 9 and at least one biometric sensor adapted to provide said biometric data processing device with a biometric data set.

* * * * *